United States Patent
Roisen et al.

(10) Patent No.: US 9,897,683 B2
(45) Date of Patent: Feb. 20, 2018

(54) REAL TIME LOCATION SYSTEM AND METHOD

(71) Applicant: Horse Sense Shoes, LLC, Plymouth, MN (US)

(72) Inventors: Roger Roisen, Minnetrista, MN (US); Craig S. Wilson, Arden Hills, MN (US); Michael McHugh, Plymouth, MN (US)

(73) Assignee: Horse Sense Shoes, LLC, Plymouth, MN (US)

(*) Notice: Subject to any disclaimer, the term of this patent is extended or adjusted under 35 U.S.C. 154(b) by 0 days.

(21) Appl. No.: 14/692,537

(22) Filed: Apr. 21, 2015

(65) Prior Publication Data

US 2015/0301155 A1 Oct. 22, 2015

Related U.S. Application Data

(60) Provisional application No. 61/982,125, filed on Apr. 21, 2014.

(51) Int. Cl.
*G08B 5/22* (2006.01)
*G08B 25/00* (2006.01)
*G01S 5/02* (2010.01)

(52) U.S. Cl.
CPC .................. *G01S 5/0289* (2013.01)

(58) Field of Classification Search
CPC .... G01S 5/0294; G01S 5/0289; G01S 13/878; G08B 21/18; G08B 3/1083; G08B 13/2462; G07C 9/00111; G06K 2017/0045
USPC .................. 340/686.1, 286.14, 10.42, 539.13
See application file for complete search history.

(56) References Cited

U.S. PATENT DOCUMENTS

| | | | |
|---|---|---|---|
| 2009/0121843 A1* | 5/2009 | Bauchot | G06K 7/0008 340/10.31 |
| 2015/0112769 A1* | 4/2015 | Collins | G06Q 10/0637 705/7.36 |
| 2016/0054865 A1* | 2/2016 | Kerr | H04L 67/02 715/739 |

* cited by examiner

*Primary Examiner* — George Bugg
*Assistant Examiner* — Anthony D Afrifa-Kyei
(74) *Attorney, Agent, or Firm* — Schwegman Lundberg & Woessner, P.A.

(57) ABSTRACT

A method includes receiving a transmitted signal containing an object identifier at multiple dispersed antennas, and utilizing inverse Kriging to identify a probable location of each object within a reception area. An object being tracked may detect an event, generate a communication indicative of the event and an object identifier, and transmit the communication to multiple receivers to identify a location of the object.

4 Claims, 7 Drawing Sheets

REAL TIME LOCATION SYSTEM AND METHOD

RELATED APPLICATION

This application claims priority to U.S. Patent Application Ser. No. 61/982,125 (entitled Real Time Location System and Method, filed Apr. 21, 2014) which is incorporated herein by reference.

BACKGROUND

Prior RTLS employ 2.4 Ghz WiFi signal saturation to "ping" tracked devices as the monitored devices move from location to location. The current systems rely on time of flight RF signals for location estimation. Time of flight systems, no matter what frequency and modulation technique, will not work correctly on liquid assets due to variation in attenuation of RF signals. Prior art also requires very precise timing for time of flight measurements and thus are more costly than the proposed solution. Geographic Positioning Satellite (GPS) based systems are also very expensive for a large number of objects and GPS is not effective or reliable without clear line of sight between the objects tracked and the satellites.

SUMMARY

A method includes receiving a transmitted signal containing an object identifier at multiple dispersed antennas, and utilizing inverse Kriging to identify a probable location of each object within a reception area. An object being tracked may detect an event, generate a communication indicative of the event and an object identifier, and transmit the communication to multiple receivers to identify a location of the object.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of firmware and human implemented procedures in one embodiment. The firmware may consist of computer executable instructions stored in flash or FRAM memory. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system for real time location via a technique known as Kriging is described. Kriging is a mathematical approach to 3D mapping using particular parameters to create contour maps. In various example embodiments, inverse Kriging uses one or more of the following attributes: relative signal strength indicator (RSSI), barometric pressure, magnetic direction and movement as the parameters for 3D mapping. In Inverse Kriging, a grid of receivers is used to determine a known state of transmitters and to develop a neighborhood signature, unique to each defined neighborhood of objects. The attributes listed above are used to create a neighborhood signature and profile that is dependent on position in X,Y,Z and allows for position prediction. Whenever movement of an object is detected, the neighborhood signatures are recomputed to determine where the object moved from and where it moved to. New objects introduced into the system may be logged into a neighborhood and the neighborhood signatures are recomputed. Kriging is one mathematical method that may be used for interpolation between assets for predicting position.

Figure 1:
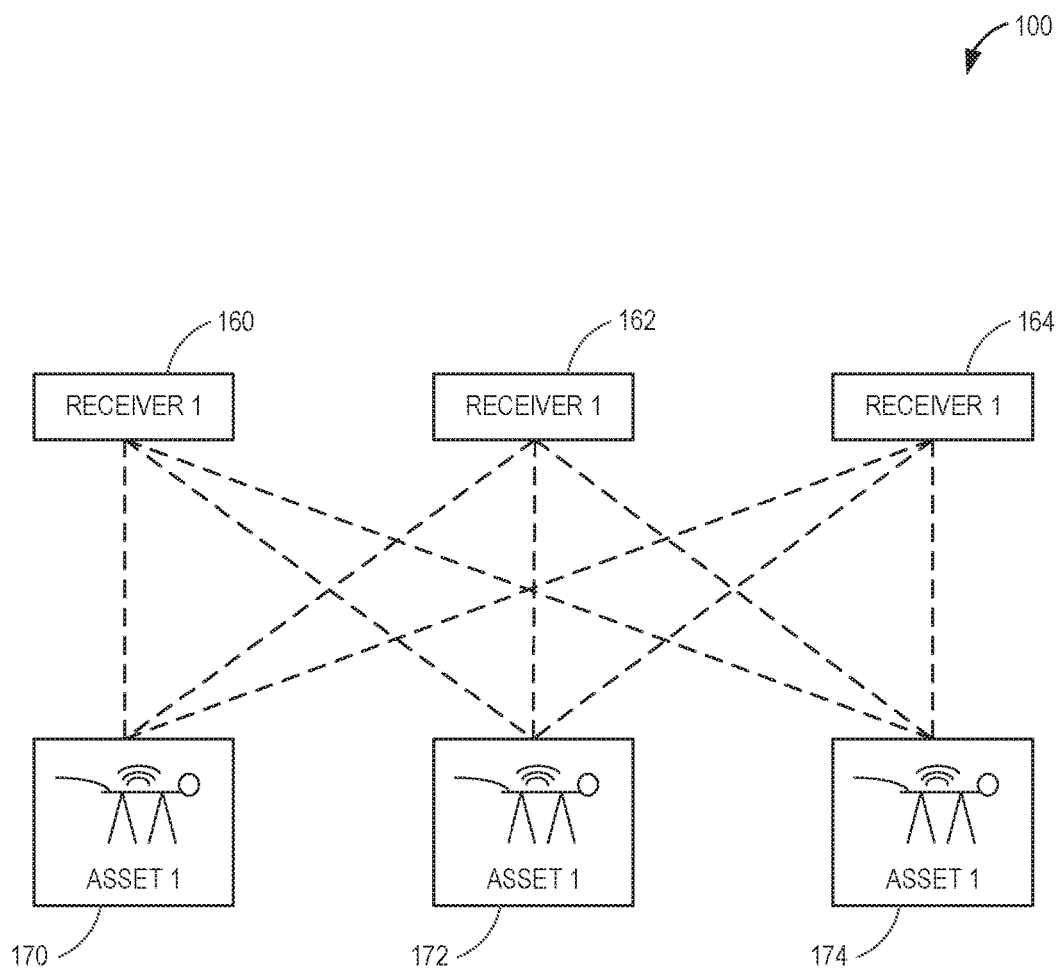
FIG. 1 is a block diagram of a warehouse distribution center having multiple stacked objects such as pallets and an array of receivers to determine location of each object according to an example embodiment.

FIG. 1 is a block diagram illustrating three receivers 160, 162, and 164 suitably spaced apart and positioned to detect transmissions from one or more objects 170, 172, and 164 located within range of the receivers. The objects may be many different things in various embodiments, such as horses and cows in a barn or outside the barn in a field, pallets in a warehouse or distribution facility, or other objects within a space where transmissions may be received by the receivers. The assets include a device that transmits signals periodically, or upon certain detected events.

Figure 2:
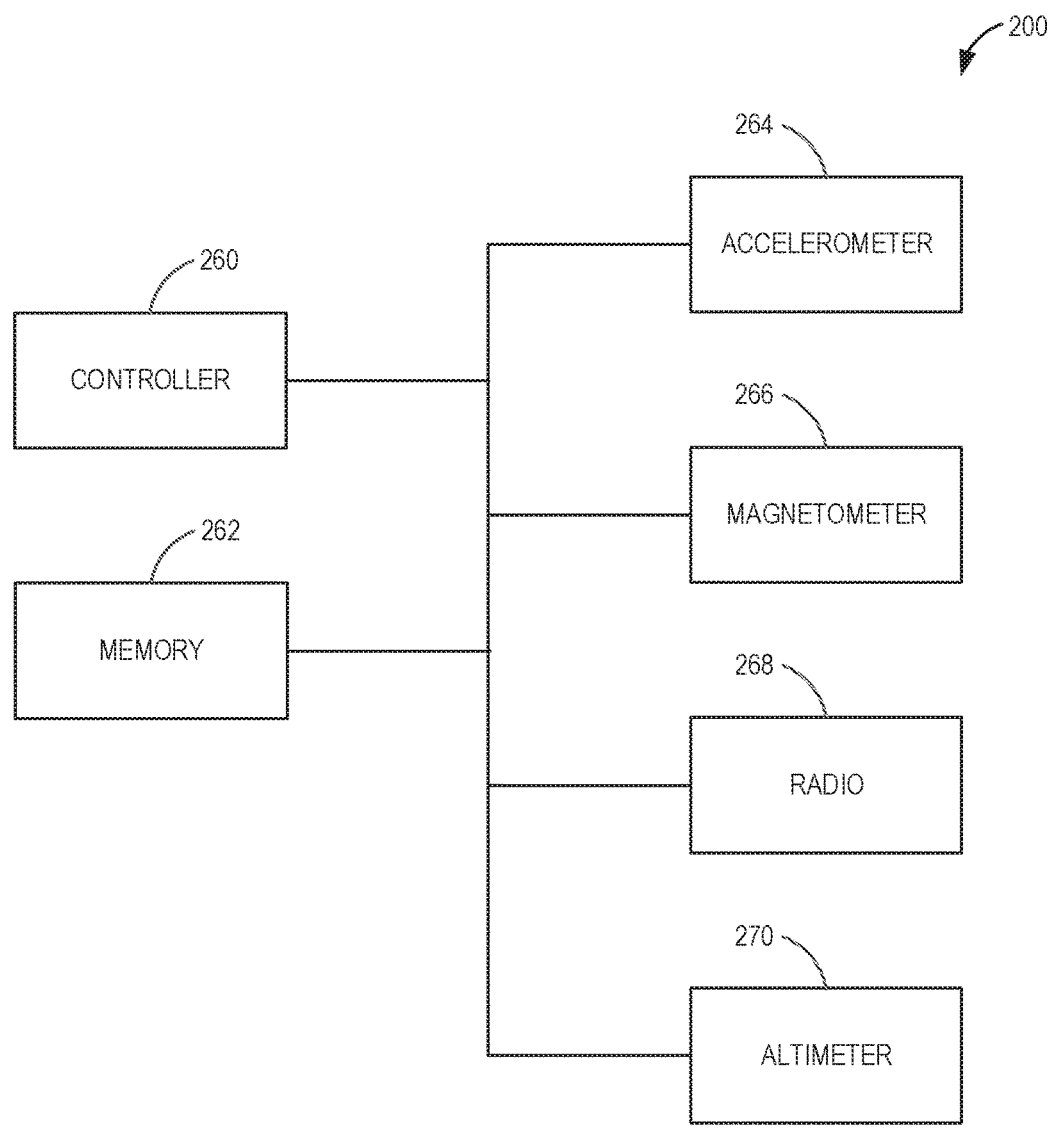
FIG. 2 is a block diagram of a three dimension stack of 27 pallets or objects with an associated numbering scheme to identify location of the objects according to an example embodiment.

FIG. 2 is a block diagram of a device 200 for attaching to each asset. Device 200 may comprises a circuit board such as a printed circuit board or other type of board suitable for supporting a plurality of components which may include a low power microcontroller 260, memory device 262 for storing programming and data, accelerometer 264, magnetometer 266, transmitter 268 such as a 433 mhz radio, and an altimeter 270 for providing data representative of barometric pressure. In one embodiment, the circuit board may be formed of a flexible material with an adhesive for attaching the circuit board. In further embodiments, the circuit board and components may be encompassed in a protective package to protect the components from weather when attached to an animal or other object subject to varying environmental conditions.

In one embodiment, the magnetometer 266 alarms on movement, prompting the controller to execute a program or be hardwired to cause the radio to transmit information, including an identification of the asset. Similarly, the accelerometer 264 alarms on impact levels. Responsive to such alarms, optionally including a detected change in altitude via altimeter 270, the radio 268 bursts ID and information about the alarm situation to the receivers, each being an access point.

Figure 3:
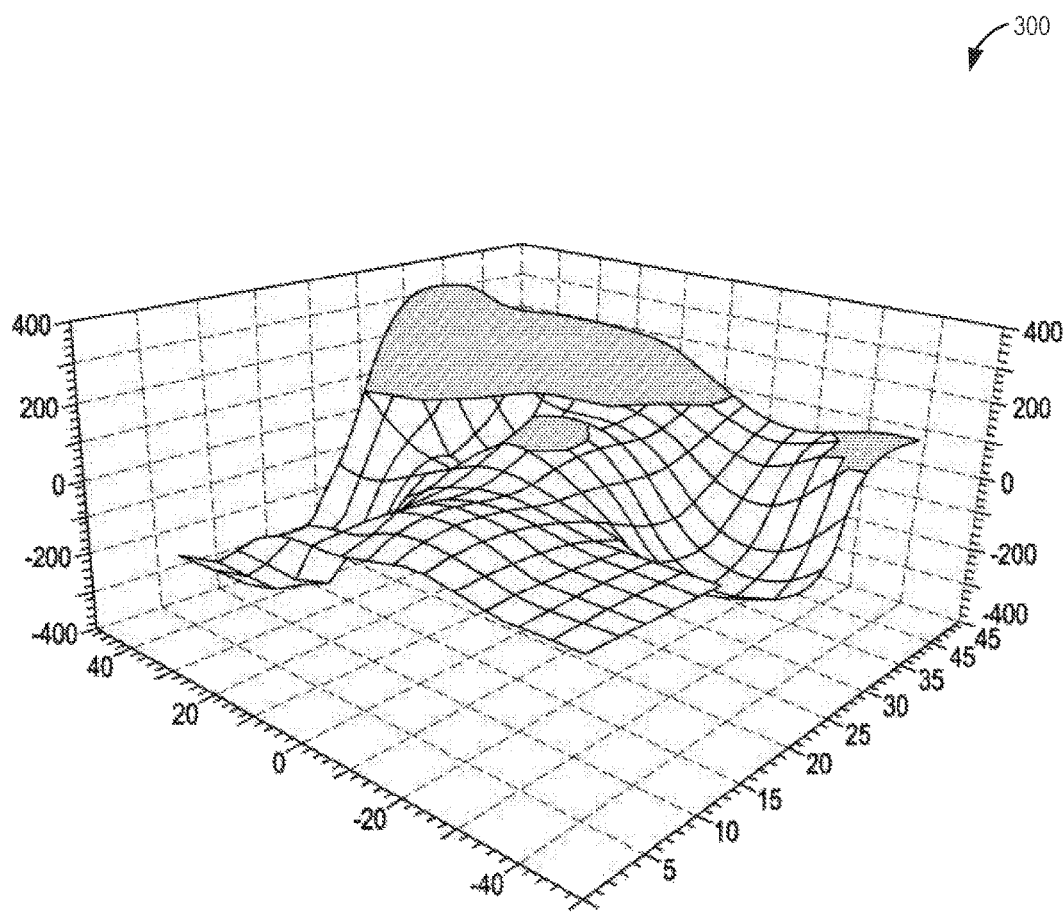
FIG. 3 is a block diagram of a transmitter device to couple to objects according to an example embodiment.

The access point calculates a neighborhood signature using received signal strength utilizing inverse Kriging in one embodiment. An example neighborhood signature profile in the form of a three dimensional contour plot of signal strength is illustrated at 300 in FIG. 3. Each box on the map indicates an asset, while each axis represents a distance of the asset from the corresponding receivers. Upon movement of an asset, the contour plot is remapped using the Kriging algorithm and thus the new location is inferred via interpolation.

Figure 4:
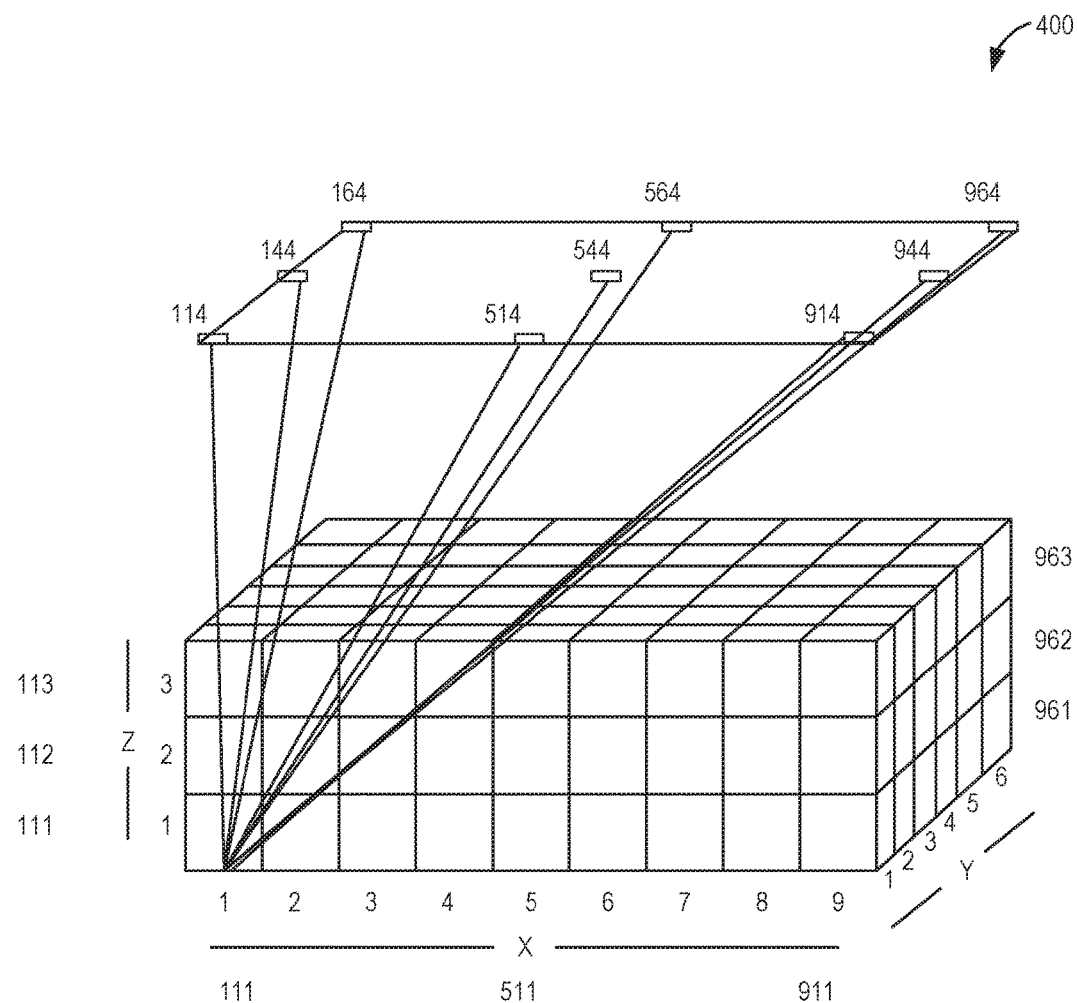
FIG. 4 is a flowchart illustrating a method for mapping and locating objects having transmitters according to an example embodiment.

FIG. 4 is a block diagram of a warehouse distribution center having multiple stacked pallets and an array of receivers to determine location of each pallet according to an example embodiment. XYZ coordinates are depicted and an array of receivers (114, 144, 164, etc) are shown. Each object is represented by a cube. Each cube has the RTLS system hardware attached to it via tape or another style connector. The receivers measure signal strength from the transmitters, and given the known start state, computer neighborhood signatures associated with the location.

When the object is initially checked into the distribution center, the a location and information about the nature of the object are captured into the system. The pallet is then placed into the predetermined location. The RTLS hardware emits a RF signal containing a unique code. The Kriging algorithm is used to create a 3d map of the signal strength associated with the location. When the object moves, the process is repeated. Various embodiments include sub 1 Ghz low baud rate transmitters that wake up upon detection of movement. In one embodiment the location is remapped every hour or upon movement and the resulting location is provided to a graphical user interface, which may include a representation of the space within range of the receivers.

Figure 5:
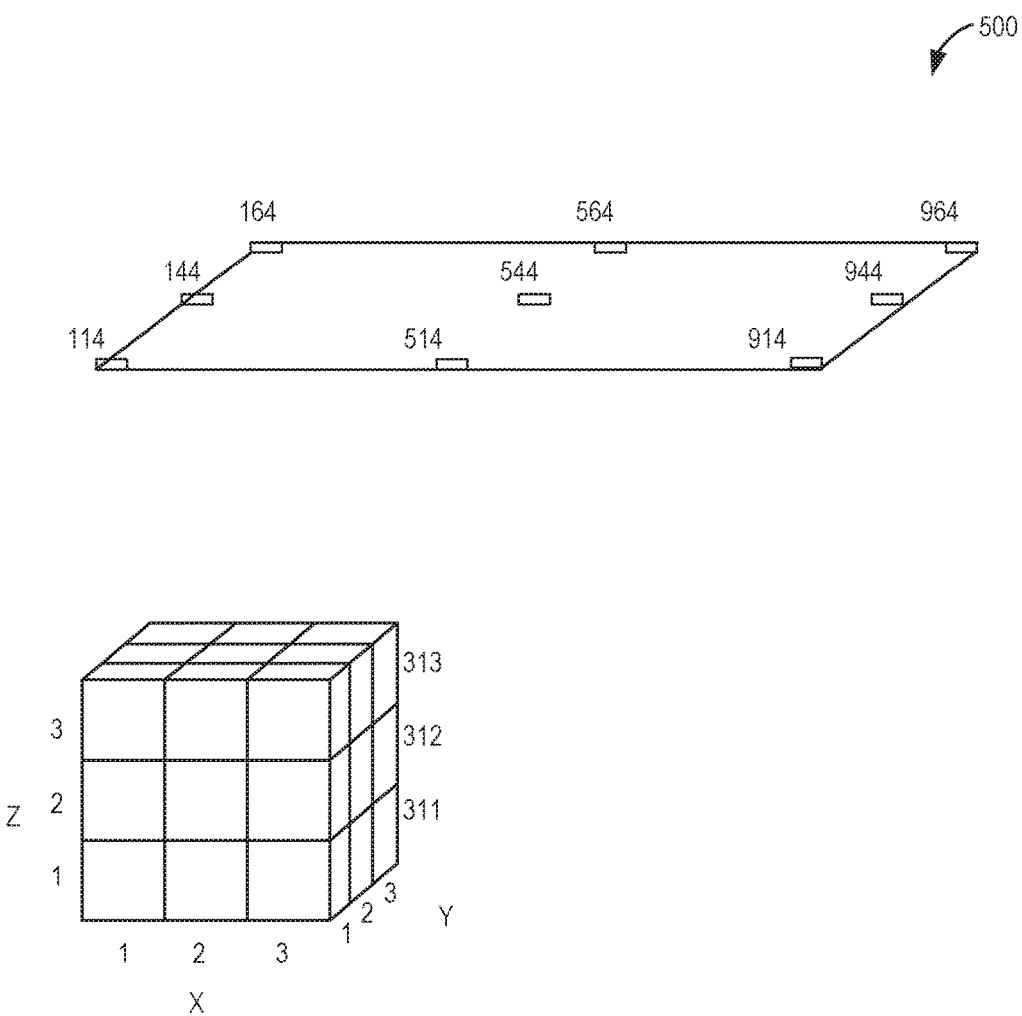
FIG. 5 is a block diagram of processing circuitry for implementing one or more methods according to example embodiments.

FIG. 5 is a block diagram of a three dimension stack of 27 objects with an associated numbering scheme to identify location of the objects according to an example embodiment. The numbering system utilizes three a three axis geometry, with an x axis, y axis, and z axis. A front of the stack shows the x and z axis with the y a axis extending visually into the diagram. A lower left object has a position of 111, corresponding to x, y, and z being 1. Above the 111 object forming a column in the z direction are objects 112 and 113. In a back column behind the 111 object are objects 131, 312, and 133. On the right side of the diagram, location numbers of 311, 312, and 313 correspond to a column of objects on the right front side of the stack of objects, and objects 331, 332, and 333 correspond to a column of objects on the right back side of the stack of objects. Receivers 114, 144, 164, 514, 544, 565, 914, 944, and 964 are shown in a grid spaced apart from the stack of objects.

The drawing (tags_with_location) show how the numbering system will work for X,Y,Z location. In one embodiment, "weighting" assigned to each x,y,z location and the next page is a drawing of how it would work for animals.

Figure 6:
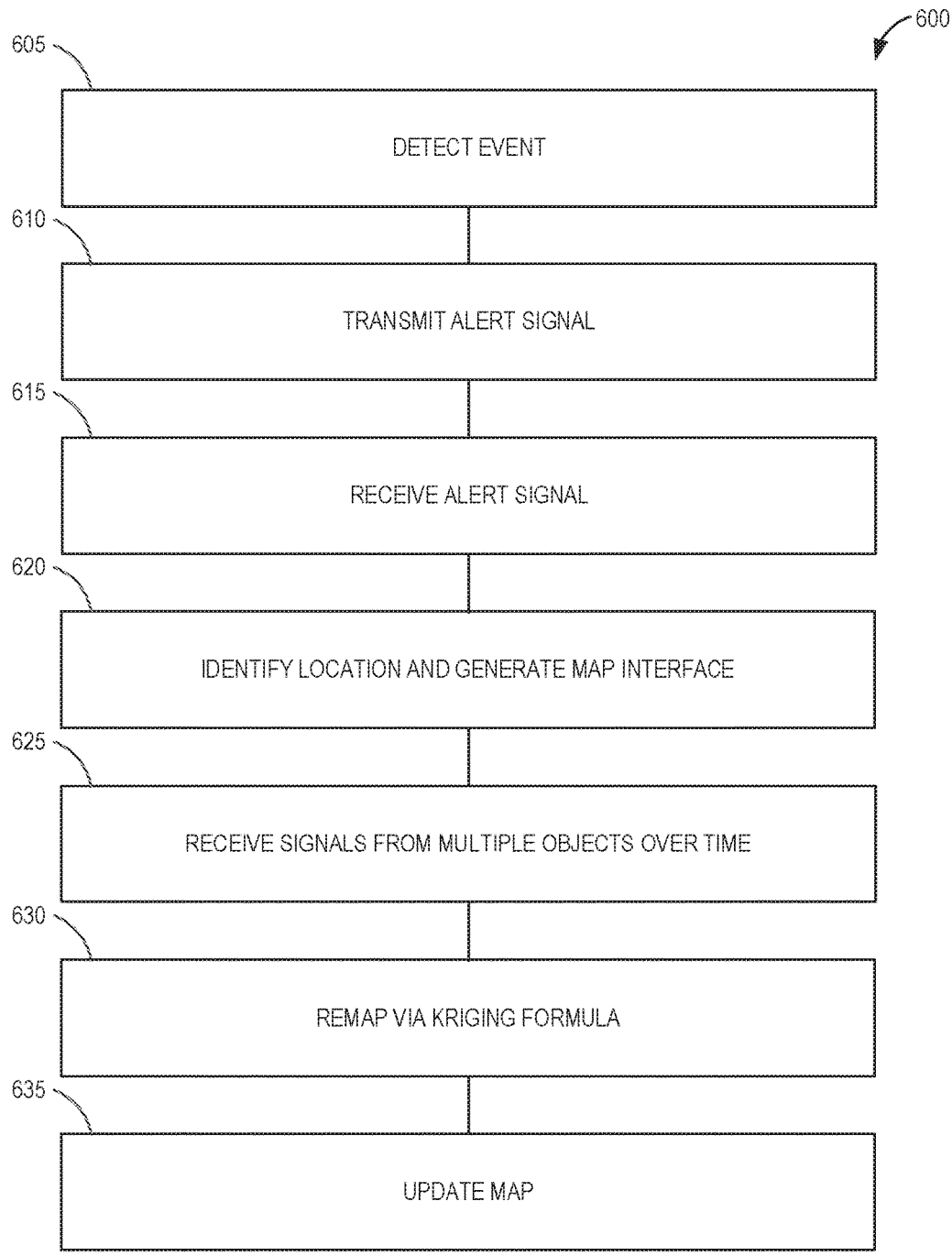
FIG. 6 is a flowchart illustrating object location according to an example embodiment.

FIG. 6 is a flowchart illustrating a method 600 of mapping object location utilizing inverse Kriging. An event may be detected at an object at 605. The event may be related to movement, an impact, an altitude change or any other sensed parameter, such as temperature, heart rate, or other physiological parameter. In some cases, the event may result from detection of a signal from another device or a passage of a set time corresponding to a period. At 610, an alert signal is transmitted upon an event and is received at 615 by one or more receivers positioned in a grid. At 620, the alert signal is processed in a predetermined manner to identify location of the object and generate a user interface representative of that location, which may include a map showing the location of each object being tracked.

At 625, signals from all inventoried object may be received over an hour long period and remapped at 630 as a function of signal strength and optionally pressure per the inverse Kriging formulae. At 635, a new map may be created to illustrate a new position of the object being tracked.

In one embodiment, the mapping is determined with a mathematical model utilizing Kriging Weights:

$$\begin{pmatrix} w_1 \\ \vdots \\ w_n \end{pmatrix} = \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}$$

Interpolation by simple Kriging to identify object location may be given by:

$$\hat{Z}(x_0) = \begin{pmatrix} z_1 \\ \vdots \\ z_n \end{pmatrix}' \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}$$

A Kriging error may be given by:

$$\mathrm{Var}\bigl(\hat{Z}(x_0) - Z(x_0)\bigr) = \underbrace{c(x_0, x_0) - \begin{pmatrix} c(x_1, x_0) \\ \vdots \\ c(x_n, x_0) \end{pmatrix}' \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}}_{\mathrm{Var}(\hat{Z}(x_0))}$$

which leads to a generalised least squares version of the Gauss-Markov theorem (Chiles & Delfiner 1999, p. 159):

$$\mathrm{Var}(Z(x_0)) = \mathrm{Var}(\hat{Z}(x_0)) + \mathrm{Var}(\hat{Z}(x_0) - Z(x_0)).$$

Figure 7:
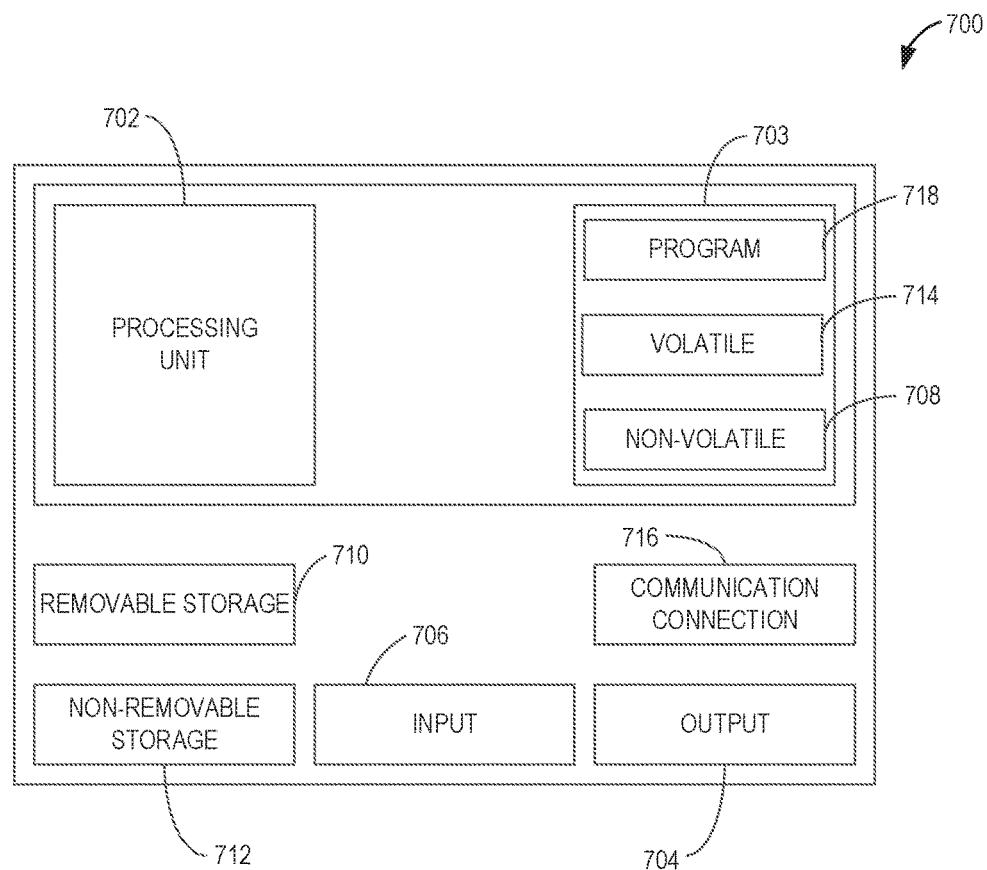
FIG. 7 is a block diagram illustrating circuitry to perform methods according to example embodiments.

FIG. 7 is a block schematic diagram of a computer system 700 to implement a controller according to an example embodiment. The controller may utilize fewer components than shown in FIG. 7 in some embodiments to perform the methods described. One example computing device in the form of a computer 700, may include a processing unit 702, memory 703, removable storage 710, and non-removable storage 712. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

EXAMPLES

1. A device comprising:
a printed circuit board;
a plurality of components supported by the printed circuit board comprising:
a low power microcontroller;
a magnetometer coupled to the microcontroller;
an accelerometer coupled to the microcontroller; and
a transmitter coupled to the microcontroller.
2. The device of example 1 wherein the magnetometer alarms on movement.
3. The device of any of examples 1-2 wherein the accelerometer alarms on impact.
4. The device of any of examples 1-3 wherein the transmitter is coupled to provide a transmission burst of ID to an access point.
5. The device of example 4 wherein the transmitter is coupled to provide an indication of an alarm situation to an access point.
6. The device of any of examples 4-5 wherein the access point calculates the neighborhood signature using a transmission burst signal strength.
7. The device of any of examples 4-6 wherein the access point comprises multiple dispersed antennas to receive the transmission bursts.
8. The device of example 6 wherein the antennas are arranged in a grid.
9. The device of any of examples 1-8 wherein the transmitter comprises a 433 MHz transmitter.
10. The device of any of examples 1-9 wherein the transmitter comprises a 1 Ghz low baud rate transmitter.
11. A method comprising:
transmitting an alert signal upon an event;
receiving an alert signal;
processing the alert signal and reacting per a predetermined setup;
receiving signals from all inventoried devices over an hour long period; and
remapping the signal strength and pressure per inverse Kriging formulae to generate a new map.
12. The method of example 11 whereas the new map determines a new position of the asset that is being tracked.
13. The method of any of examples 11-12 wherein the mapping is determined with a mathematical model described by:
Kriging weights:

$$\begin{pmatrix} w_1 \\ \vdots \\ w_n \end{pmatrix} = \begin{pmatrix} c(x_1, x_1) & \ldots & c(x_1, x_n) \\ \vdots & \ddots & \vdots \\ c(x_n, x_1) & \ldots & c(x_n, x_n) \end{pmatrix}^{-1} \begin{pmatrix} c(x_1, x_0) \\ \vdots \\ c(x_n, x_0) \end{pmatrix}$$

an interpolation by simple kriging is given by:

$$\hat{Z}(x_0) = \begin{pmatrix} z_1 \\ \vdots \\ z_n \end{pmatrix}' \begin{pmatrix} c(x_1, x_1) & \ldots & c(x_1, x_n) \\ \vdots & \ddots & \vdots \\ c(x_n, x_1) & \ldots & c(x_n, x_n) \end{pmatrix}^{-1} \begin{pmatrix} c(x_1, x_0) \\ \vdots \\ c(x_n, x_0) \end{pmatrix}$$

a kriging error given by:

$$\mathrm{Var}\big(\hat{Z}(x_0) - Z(x_0)\big) =$$

$$\underbrace{c(x_0, x_0)}_{\mathrm{Var}(Z(x_0))} - \underbrace{\begin{pmatrix} c(x_1, x_0) \\ \vdots \\ c(x_n, x_0) \end{pmatrix}' \begin{pmatrix} c(x_1, x_1) & \ldots & c(x_1, x_n) \\ \vdots & \ddots & \vdots \\ c(x_n, x_1) & \ldots & c(x_n, x_n) \end{pmatrix}^{-1} \begin{pmatrix} c(x_1, x_0) \\ \vdots \\ c(x_n, x_0) \end{pmatrix}}_{\mathrm{Var}(\hat{Z}(x_0))}$$

which leads to a generalized least squares version of the Gauss-Markov theorem:

$$\mathrm{Var}(Z(x_0)) = \mathrm{Var}(\hat{Z}(x_0)) + \mathrm{Var}(\hat{Z}(x_0) - Z(x_0)).$$

14. A method comprising:
receiving a transmitted signal containing an object identifier at multiple dispersed antennas; and
utilizing inverse Kriging to identify a probable location of each object within a reception area.
15. The method of example 14 and further comprising:
receiving transmitted signals contain object identifiers from multiple objects within the reception area;
utilizing inverse Kriging to identify probable locations of each object; and
creating a map of the objects for display of the probably locations of the objects.
16. The method of any of examples 14-15 wherein the transmitted signal is received when the object transmits the signal responsive to a detected event.
17. A method comprising:
detecting an event at an object;
generating a communication indicative of the event and an object identifier; and
transmitting the communication to multiple receivers to identify a location of the object.
18. The method of example 17 wherein the event comprises expiration of a time period.
19. The method of example 18 wherein the event comprises detection of movement of the object.
20. The method of example 19 wherein the event comprises detection of impact.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following statements are potential claims that may be converted to claims in a future application. No modification of the following statements should be allowed to affect the interpretation of claims which may be drafted when this provisional application is converted into a regular utility application.

The invention claimed is:

1. A method comprising:
   transmitting an alert signal upon an event;
   receiving an alert signal;
   processing the alert signal and reacting per a predetermined setup;
   receiving signals from all inventoried devices over an hour long period; and
   remapping the signal strength and pressure per inverse Kriging formulae to generate a new map,
   wherein the remapping is determined with a mathematical model described by:
Kriging weights:

$$\begin{pmatrix} w_1 \\ \vdots \\ w_n \end{pmatrix} = \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}$$

an interpolation by simple kriging is given by:

$$\hat{Z}(x_0) = \begin{pmatrix} z_1 \\ \vdots \\ z_n \end{pmatrix}' \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}$$

a kriging error given by:

$$\text{Var}(\hat{Z}(x_0) - Z(x_0)) = \frac{\frac{c(x_0, x_0)}{\text{Var}(Z(x_0))} - \begin{pmatrix} c(x_1, x_0) \\ \vdots \\ c(x_n, x_0) \end{pmatrix}' \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}}{\text{Var}(\hat{Z}(x_0))}$$

which leads to a generalized least squares version of the Gauss-Markov theorem:

$$\text{Var}(Z(x_0)) = \text{Var}(\hat{Z}(x_0)) + \text{Var}(\hat{Z}(x_0) - Z(x_0)).$$

2. The method of claim 1 whereas the new map determines a new position of the asset that is being tracked.

3. A method comprising:
   receiving a transmitted signal containing an object identifier at multiple dispersed antennas;
   utilizing inverse Kriging to identify a probable location of each object within a reception area;
   receiving transmitted signals containing object identifiers from multiple objects within the reception area;
   utilizing inverse Kriging to identify probable locations of each object; and
   creating a map of the objects for display of the probable locations of the objects including using a mathematical model described by;
Kriging weights:

$$\begin{pmatrix} w_1 \\ \vdots \\ w_n \end{pmatrix} = \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}$$

an interpolation by simple kriging is given by:

$$\hat{Z}(x_0) = \begin{pmatrix} z_1 \\ \vdots \\ z_n \end{pmatrix}' \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}$$

a kriging error given by:

$$\text{Var}(\hat{Z}(x_0) - Z(x_0)) = \frac{\frac{c(x_0, x_0)}{\text{Var}(Z(x_0))} - \begin{pmatrix} c(x_1, x_0) \\ \vdots \\ c(x_n, x_0) \end{pmatrix}' \begin{pmatrix} c(x_1, x_1) & \cdots & c(x_1, x_n) \\ \vdots & \ddots & \vdots \\ c(x_n, x_1) & \cdots & c(x_n, x_n) \end{pmatrix}^{-1} \begin{pmatrix} c(x_1, x_0) \\ \vdots \\ c(x_n, x_0) \end{pmatrix}}{\text{Var}(\hat{Z}(x_0))}$$

which leads to a generalized least squares version of the Gauss-Markov theorem:

$$\text{Var}(Z(x_0)) = \text{Var}(\hat{Z}(x_0)) + \text{Var}(\hat{Z}(x_0) - Z(x_0)).$$

4. The method of claim 3 wherein the transmitted signal is received when the object transmits the signal responsive to a detected event.

* * * * *